(12) United States Patent
Huang

(10) Patent No.: US 9,664,988 B2
(45) Date of Patent: May 30, 2017

(54) LIGHT SOURCE SYSTEM WITH LIGHT COUPLING MODULE AND DISPLAY APPARATUS COMPRISING THE SAME

(71) Applicant: DELTA ELECTRONICS, INC., Kuei San, Taoyuan Hsien (TW)

(72) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 58 days.

(21) Appl. No.: 14/271,789

(22) Filed: May 7, 2014

(65) Prior Publication Data

US 2015/0146173 A1 May 28, 2015

(30) Foreign Application Priority Data

Nov. 28, 2013 (TW) .............................. 102143385 A

(51) Int. Cl.
| | | |
|---|---|---|
| G02B 27/14 | (2006.01) | |
| G03B 21/20 | (2006.01) | |
| G03B 21/602 | (2014.01) | |
| G02B 27/10 | (2006.01) | |

(52) U.S. Cl.
CPC ..... *G03B 21/2033* (2013.01); *G02B 27/1006* (2013.01); *G02B 27/143* (2013.01); *G02B 27/146* (2013.01); *G03B 21/208* (2013.01); *G03B 21/2013* (2013.01); *G03B 21/2066* (2013.01); *G03B 21/602* (2013.01)

(58) Field of Classification Search
CPC ............ G03B 21/2013; G03B 21/2033; G03B 21/2066; G03B 21/602; G03B 21/208; G02B 27/0994; G02B 27/1006; G02B 27/143; G02B 27/146
See application file for complete search history.

(56) References Cited

U.S. PATENT DOCUMENTS

| | | | | |
|---|---|---|---|---|
| 5,877,898 A | * | 3/1999 | Hollemann | .......... G02B 27/143 |
| | | | | 359/619 |
| 6,250,778 B1 | * | 6/2001 | Doumuki | ............... G02B 5/045 |
| | | | | 362/268 |
| 6,356,577 B1 | * | 3/2002 | Miller | .................... G02B 5/045 |
| | | | | 372/100 |

(Continued)

FOREIGN PATENT DOCUMENTS

| | | |
|---|---|---|
| CN | 1841183 A | 10/2006 |
| CN | 101004483 A | 7/2007 |

(Continued)

*Primary Examiner* — Bao-Luan Le
(74) *Attorney, Agent, or Firm* — Muncy, Geissler, Olds & Lowe, P.C.

(57) ABSTRACT

A light source system includes a laser module and at least one light coupling module. The laser module includes a plurality of laser sources, each of which provides a light beam. The light coupling module has a light incident surface, a plurality of total reflection surfaces and a light output surface. The light incident surface includes a plurality of light incident zones, and the light incident zones are disposed corresponding to the laser sources, respectively. The total reflection surfaces are disposed corresponding to the light incident zones, respectively. The projected areas of the total reflection surfaces on the light output surface have no overlap with each other.

7 Claims, 3 Drawing Sheets

(56) References Cited

U.S. PATENT DOCUMENTS

| | | | | |
|---|---|---|---|---|
| 6,377,410 B1* | 4/2002 | Wang | G02B 27/09 | 359/837 |
| 6,504,650 B1* | 1/2003 | Alfrey | G02B 27/09 | 359/618 |
| 6,993,059 B2* | 1/2006 | Anikitchev | G02B 27/0977 | 372/100 |
| 7,088,883 B2* | 8/2006 | Klimek | G02B 27/0972 | 385/15 |
| 7,195,373 B2* | 3/2007 | Ishii | G02B 27/285 | 348/E5.139 |
| 7,444,044 B2* | 10/2008 | Klimek | G02B 27/0972 | 359/628 |
| 7,965,910 B2* | 6/2011 | Klimek | G02B 27/0972 | 359/628 |
| 8,842,705 B2* | 9/2014 | Janssens | G02B 27/0961 | 372/34 |
| 2004/0252388 A1* | 12/2004 | Yamanaka | G02B 27/0905 | 359/834 |
| 2004/0252744 A1* | 12/2004 | Anikitchev | G02B 27/0977 | 372/100 |
| 2005/0069260 A1* | 3/2005 | Klimek | G02B 27/0972 | 385/50 |
| 2005/0117337 A1* | 6/2005 | Ishii | G02B 27/285 | 362/241 |
| 2006/0001973 A1* | 1/2006 | Peterson | G02B 5/04 | 359/618 |
| 2006/0170869 A1* | 8/2006 | Shestak | G02B 27/2214 | 352/57 |
| 2006/0221310 A1 | 10/2006 | Kim et al. | | |
| 2006/0263004 A1* | 11/2006 | Klimek | G02B 27/0972 | 385/18 |
| 2008/0205077 A1* | 8/2008 | Lenderink | G02B 27/0905 | 362/555 |
| 2009/0034084 A1* | 2/2009 | Klimek | G02B 27/0972 | 359/627 |
| 2009/0122272 A1* | 5/2009 | Silverstein | G02B 27/0905 | 353/81 |
| 2009/0141242 A1* | 6/2009 | Silverstein | G02B 27/0905 | 353/20 |
| 2009/0213330 A1* | 8/2009 | Silverstein | H04N 13/0438 | 353/8 |
| 2009/0284713 A1* | 11/2009 | Silverstein | G02B 27/1033 | 353/8 |
| 2010/0007852 A1* | 1/2010 | Bietry | G03B 21/28 | 353/8 |
| 2010/0277698 A1* | 11/2010 | Harland | G02B 21/1825 | 353/37 |
| 2010/0277699 A1* | 11/2010 | Silverstein | G02B 27/126 | 353/37 |
| 2010/0302514 A1* | 12/2010 | Silverstein | G02B 27/1026 | 353/37 |
| 2011/0007279 A1* | 1/2011 | Silverstein | G02B 26/008 | 353/8 |
| 2011/0013144 A1* | 1/2011 | Silverstein | G03B 33/06 | 353/8 |
| 2011/0242497 A1 | 10/2011 | Fukano | | |
| 2011/0261174 A1* | 10/2011 | Silverstein | G03B 21/14 | 348/58 |
| 2011/0261272 A1* | 10/2011 | Kotani | G02B 27/1046 | 348/789 |
| 2011/0285963 A1* | 11/2011 | Kurtz | G02B 27/18 | 353/8 |
| 2013/0169939 A1 | 7/2013 | Fukano | | |

FOREIGN PATENT DOCUMENTS

| | | | | |
|---|---|---|---|---|
| CN | 101359157 A | 2/2009 | | |
| CN | 102207669 A | 10/2011 | | |
| CN | WO 2013060509 A1 * | 5/2013 | | G02B 27/0977 |

* cited by examiner

LIGHT SOURCE SYSTEM WITH LIGHT COUPLING MODULE AND DISPLAY APPARATUS COMPRISING THE SAME

CROSS REFERENCE TO RELATED APPLICATIONS

This Non-provisional application claims priority under 35 U.S.C. §119(a) on Patent Application No(s). 102143385 filed in Taiwan, Republic of China on Nov. 28, 2013, the entire contents of which are hereby incorporated by reference.

BACKGROUND OF THE INVENTION

Field of Invention

The invention relates to an optical system and, in particular, to a light source system.

Related Art

A conventional light source system can include a single light source or a plurality of light sources. The light source system including a plurality of light sources can provide higher illumination and can be applied to an autostereoscopic 3D projection apparatus, so that it becomes the mainstream.

However, different from the light source system including a single light source, the light sources in the light source system including a plurality of light sources need to be coupled in the situation of not increasing the etendue and the light loss.

One solution is to use a laser source as the light source and the etendue can be decreased since the laser source has less etendue than an ultrahigh performance (UHP) lamp. Besides, another advantage of using laser source is that the size of the laser source is smaller, so the increment of the total size of the light source system can be limited even if a plurality of laser sources are used.

The second solution has two methods for the light coupling. One method is to use optical fibers to couple the plurality of light sources and guide the light to a specific direction, but the total light loss will be increased with the increased length of the optical fibers. The other method is to use a stepped reflector/reflective prism to guide the light of the plurality of light sources disposed it an array to a specific direction. However, due to the interval between the adjacent reflectors and the divergence caused during the light travelling, the etendue will be unavoidably accumulated by the multiple effect of the stepped reflector.

Therefore, it is an important subject to provide a light source system that has lower etendue and less light loss and can couple a plurality of light sources.

SUMMARY OF THE INVENTION

In view of the foregoing subject, an objective of the invention is to provide a light source system that has lower etendue and less light loss and can couple a plurality of light sources.

To achieve the above objective, a light source system according to the invention includes a laser module and at least one light coupling module.

The laser module includes a plurality of laser sources, each of which provides a light beam.

The light coupling module has a light incident surface, a plurality of total reflection surfaces and a light output surface.

The light incident surface includes a plurality of light incident zones, and the light incident zones are disposed corresponding to the laser sources, respectively. The total reflection surfaces are disposed corresponding to the light incident zones, respectively. The projected areas of the total reflection surfaces on the light output surface have no overlap with each other.

In one embodiment, the light beams of the laser sources enter the light coupling module, and are reflected by the total reflection surfaces to leave through the light output surface, and the light paths of the light beams are parallel.

In one embodiment, the light output surface of one of the light coupling modules is disposed corresponding to the light incident surface of another of the light coupling modules.

In one embodiment, the light source system further comprises a light combining module disposed on the light output surface of the light coupling module. The light combining module is a spectroscope or a reflector.

In one embodiment, the laser sources at least include a red laser, a blue laser and a green laser.

A display apparatus according to the invention comprises a display screen, a projection device and a light source system. The light source system provides a light source for the projection device. The projection device forms a plurality of viewing zones on the display screen.

The light source system includes a laser module and at least one light coupling module.

The laser module includes a plurality of laser sources, each of which provides a light beam. The light coupling module includes a light incident surface, a plurality of total reflection surfaces and a light output surface. The light incident surface includes a plurality of light incident zones, and the light incident zones are disposed corresponding to the laser sources, respectively. The total reflection surfaces are disposed corresponding to the light incident zones, respectively. The projected areas of the total reflection surfaces on the light output surface have no overlap with each other.

In one embodiment, the display screen includes a double-layer lenticular lens, which includes two lenticular lens layers and an omnidirectional diffuser disposed between the two lenticular lens layers.

In one embodiment, the light beams of the laser sources enter the light coupling module, and are reflected by the total reflection surfaces to leave through the light output surface, and the light paths of the light beams are parallel.

In one embodiment, the light output surface of one of the light coupling modules is disposed corresponding to the light incident surface of another of the light coupling modules.

In one embodiment, the light source system further comprises a light combining module disposed on the light output surface of the light coupling module. The light combining module is a spectroscope or a reflector.

In one embodiment, the laser sources at least include a red laser, a blue laser and a green laser.

As mentioned above, in the light source system and the display apparatus of the invention, at least one light coupling module is used to cooperate with the laser module, the light incident surface of the light coupling module is disposed corresponding to the laser module so that the light beams of the laser module can be guided to a plurality of total reflection surfaces so as to be coupled and parallel leave through the light output surface. Thereby, the plurality of light sources can be coupled while the etendue is not increased.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

To be noted, in the following embodiments and figures, the elements which are not in direct connection with the invention are omitted and not shown. Moreover, the relation between the dimensions of the elements in the figures is just for the exemplary illustration but not for representing the actual dimension proportion.

Furthermore, the light source system of the invention can be applied to a display apparatus, which at least includes a display screen, a projection device and a light source system.

If the light source system is applied to an autostereoscopic 3D projection apparatus, the display screen of the display apparatus can further include a lenticular lens, such as a double-layer lenticular lens. The lenticular lens includes two lenticular lens layers and an omnidirectional diffuser disposed between the two lenticular lens layers.

The light source system of the invention can provide the light sources with extremely low etendue which are required for the autostereoscopic 3D projection apparatus, and the projection device can form a plurality of viewing zones at the observers by the light sources with extremely low etendue and the display screen with double-layer lenticular lens.

The projection device can be a device equipped with a projection display function, such as a digital light processing (DLP) projection display, a liquid crystal display (LCD) projection device, or a liquid crystal on silicon system (LCOS system) display.

The light source system of the invention will be illustrated as below.

Figure 1:
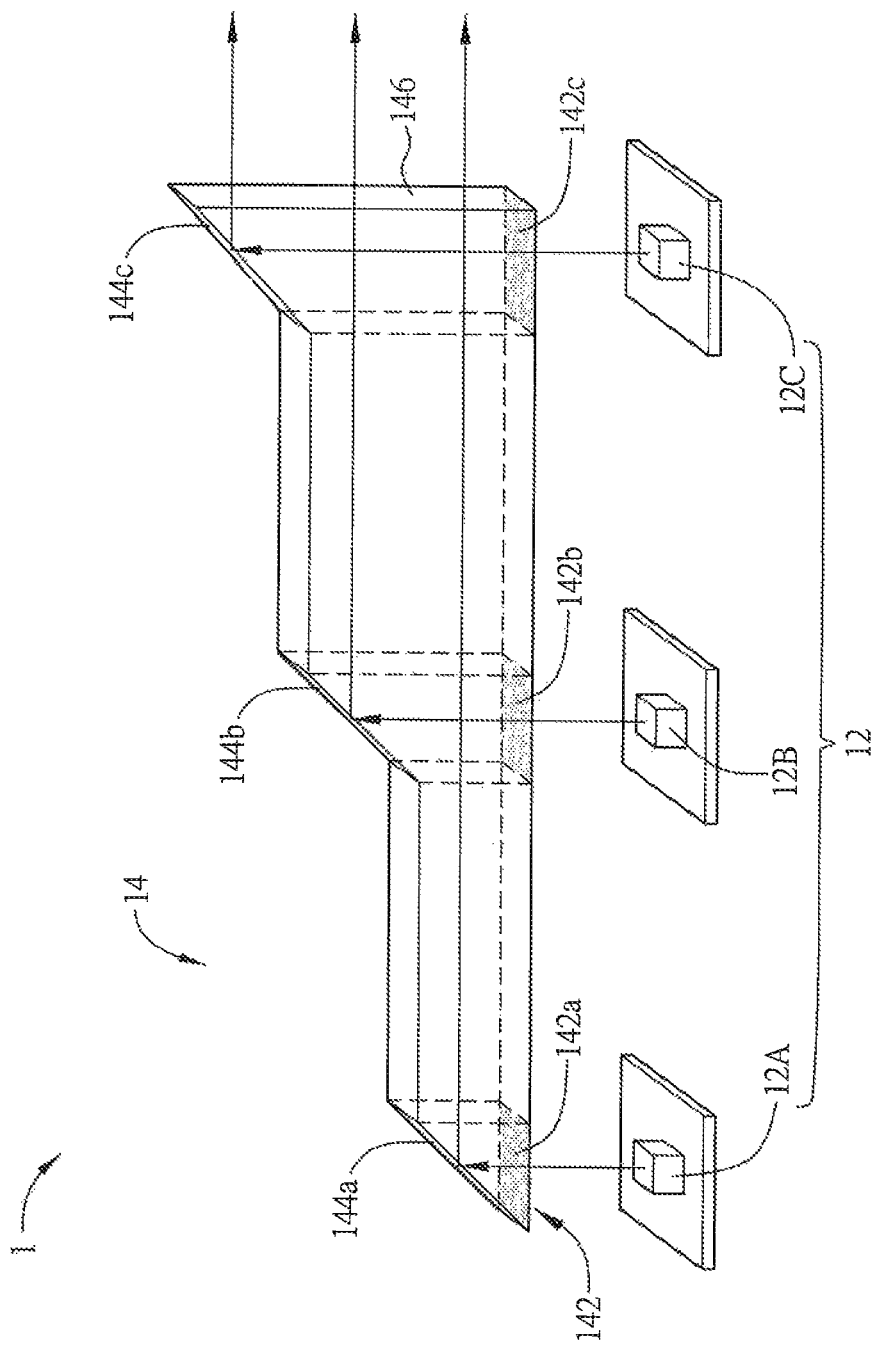
FIG. 1 is a schematic diagram of a light source system according to a first embodiment of the invention.

FIG. 1 is a schematic diagram of a light source system according to a first embodiment of the invention.

As shown in FIG. 1, the light source system 1 includes a laser module 12 and at least one light coupling module 14.

The laser module 12 includes a plurality of laser sources, each of which can provide a light beam. In this embodiment, the laser module 12 includes three laser sources 12A, 12B, 12C, and the laser sources are disposed on the same plane. Otherwise, they can be coupled into a laser source array.

In this embodiment, a single light coupling module 14 is used to cooperate with a laser module 12, but this invention is not limited thereto. The light coupling module 14 includes a light incident surface 142, a plurality of total reflection surfaces 144a, 144b, 144c and a light output surface 146.

The light incident surface 142 includes a plurality of light incident zones 142a, 142b, 142c (they are represented by the gray color in the figure, but this is just for the easy understanding but not for the actual color disposition), and the light incident zones 142a, 142b, 142c are disposed corresponding to the laser sources 12A, 12B, 12C, respectively. In other words, by the disposition of the light incident zones 142a, 142b, 142c, the light beams provided by the laser sources 12A, 12B, 12C can enter the light coupling module 14.

The total reflection surfaces 144a, 144b, 144c are disposed corresponding to the light incident zones 142a, 142b, 142c, respectively. In other words, the total reflection surfaces 144a, 144b, 144c are disposed to reflect the light beams entering through the light incident zones 142a, 142b, 142c. Besides, each of the total reflection surfaces 144a, 144b, 144c and the light incident surface 142 have an included angle of 45°, so that the included angle between the incident light and the emergent light is 90°.

By taking the laser source 12A as an example, the light beam provided thereby can enter the light coupling module 14 through the light incident zone 142a, and is reflected through the total reflection of the total reflection surface 144a and then leaves the light coupling module 14 through the light output surface 146. Likewise, the laser beams provided by the laser sources 12B, 12C can enter the light coupling module 14 through the light incident zones 142b, 142c and are reflected by the total reflection of the total reflection surfaces 144b, 144c and then leave the light coupling module 14 through the light output surface 146, respectively.

The total reflection surfaces 144a, 144b, 144c can be formed by being coated with a total reflection film.

To be noted, the projected areas of the total reflection surfaces 144a, 144b, 144c on the light output surface 146 have no overlap with each other. This indicates that the projected areas of the total reflection surfaces 144a, 144b, 144c on the light output surface 146 are disposed adjacent to each other and don't overlap each other. Therefore, the light paths of the light beams provided by the laser sources 12A, 12B, 12C after the total reflection surfaces 144a, 144b, 144c won't coincide with each other.

As shown in FIG. 1, the light beams of the laser sources 12A, 12B, 12C enter the light coupling module 14 and then are reflected by the total reflection surfaces 144a, 144b, 144c to leave through the light output surface 146. The light paths of the light beams are parallel.

By the disposition of this embodiment, the light coupling module 14 can couple the laser sources (three laser sources) into the light beams travelling along the same direction. The laser sources 12A, 12B, 12C are coupled and the light beams thereof are transmitted within the light coupling module 14, so that the total brightness of the light source system 1 is increased. Besides, since the light travelling is limited within the prism, the etendue will not be increased.

Figure 2A:
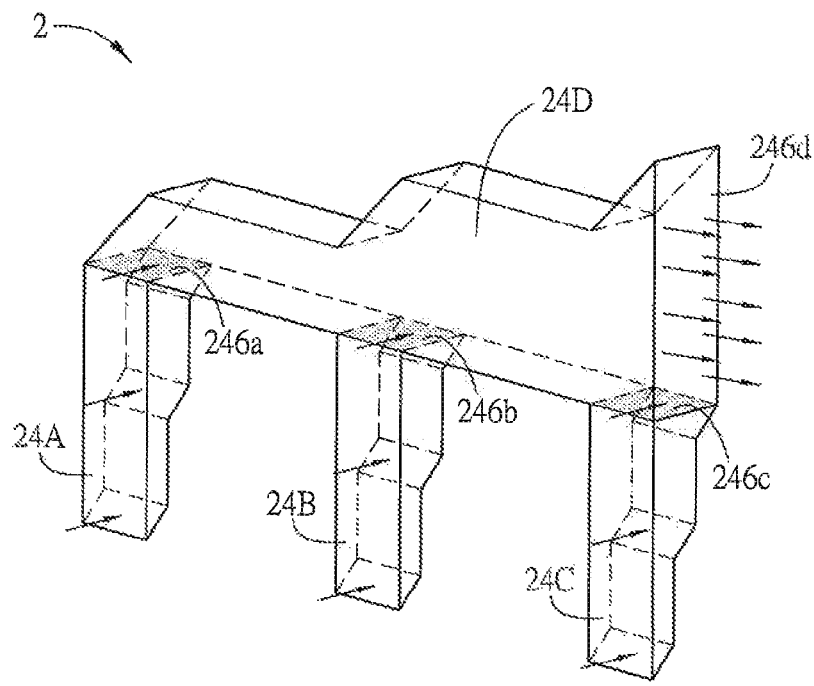
FIG. 2A is a schematic diagram of a light source system according to a second embodiment of the invention.
Figure 2B:
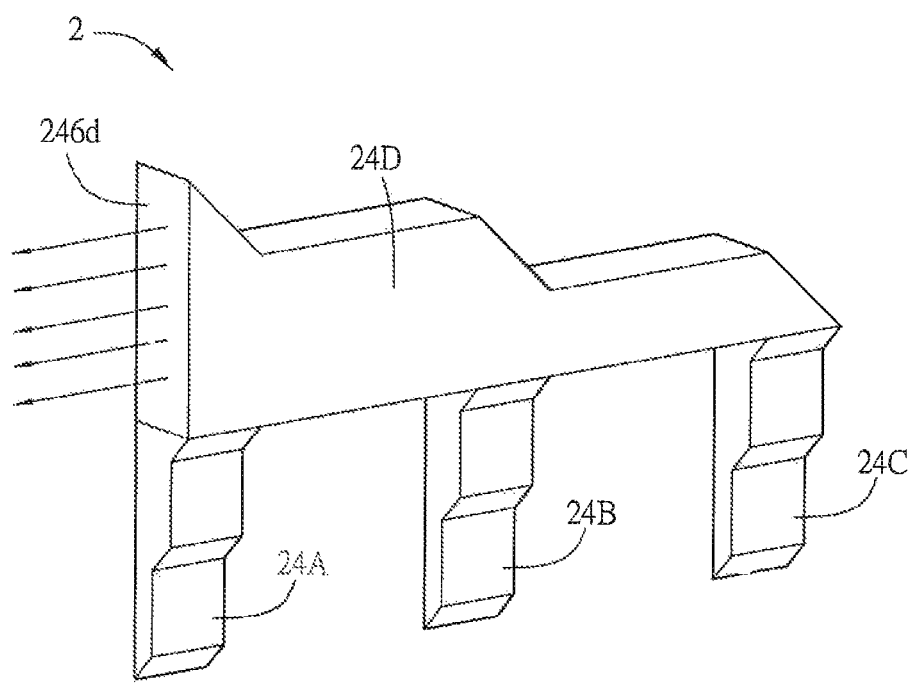
FIG. 2B is a another schematic diagram of the light source system in FIG. 2A.

FIGS. 2A and 2B are schematic diagrams of a light source system 2 of two viewing angles according to a second embodiment of the invention.

Different from the above embodiment, the laser module (not shown) of this embodiment includes nine laser sources (may be disposed in an array of 3×3). Besides, in cooperation with the laser module of this embodiment, there are four light coupling modules in this embodiment For the clear understanding, the laser sources are not shown in FIGS. 2A and 2B and just the light beams of the laser sources are shown (denoted by the arrows).

By taking the light coupling module 24A as an example, like the above embodiment, the light coupling module 24A can couple the light beams of the three laser sources, and the light beams of the three laser sources will leave through the light output surface 246a of the light coupling module 24A. Moreover, the light output surface 246a of the light coupling module 24A is disposed corresponding to the light incident surface of the light coupling module 24D. Furthermore, the light output surface 246a of the light coupling module 24A is disposed corresponding to the light incident zone of the light incident surface of the light coupling module 24D. Besides, the light output surface 246a of the light coupling module 24A and the light incident zone of the light incident surface of the light coupling module 24D coincide with each other, but they can have equal or unequal area.

Likewise, each of the light coupling modules 24B, 24C also can couple the light beams of the three laser sources, and the light beams will be transmitted to the light incident surface of the light coupling module 24D through the light output surfaces 246b, 246c. The light beams transmitted by the light output surfaces 246a, 246b, 246c of the light coupling modules 24A, 24B, 24C can be considered three independent light sources. Therefore, the light coupling module 24D can couple the light beams of the light coupling modules 24A, 24B, 24C into a light beam and output the light beam through the light output surface 246d.

To be noted, the forms of the light coupling modules 24A, 24B, 24C, 24D can be adjusted according to the requirement and the disposition, and they can be the same or different. Herein for example, the light coupling modules 24A, 24B, 24C have the same form, and the light coupling module 24D is slightly greater than the light coupling modules 24A, 24B, 24C.

The other disposition, elements and the relation of the elements are similar to the first embodiment, so they are not described here for conciseness.

Figure 3:
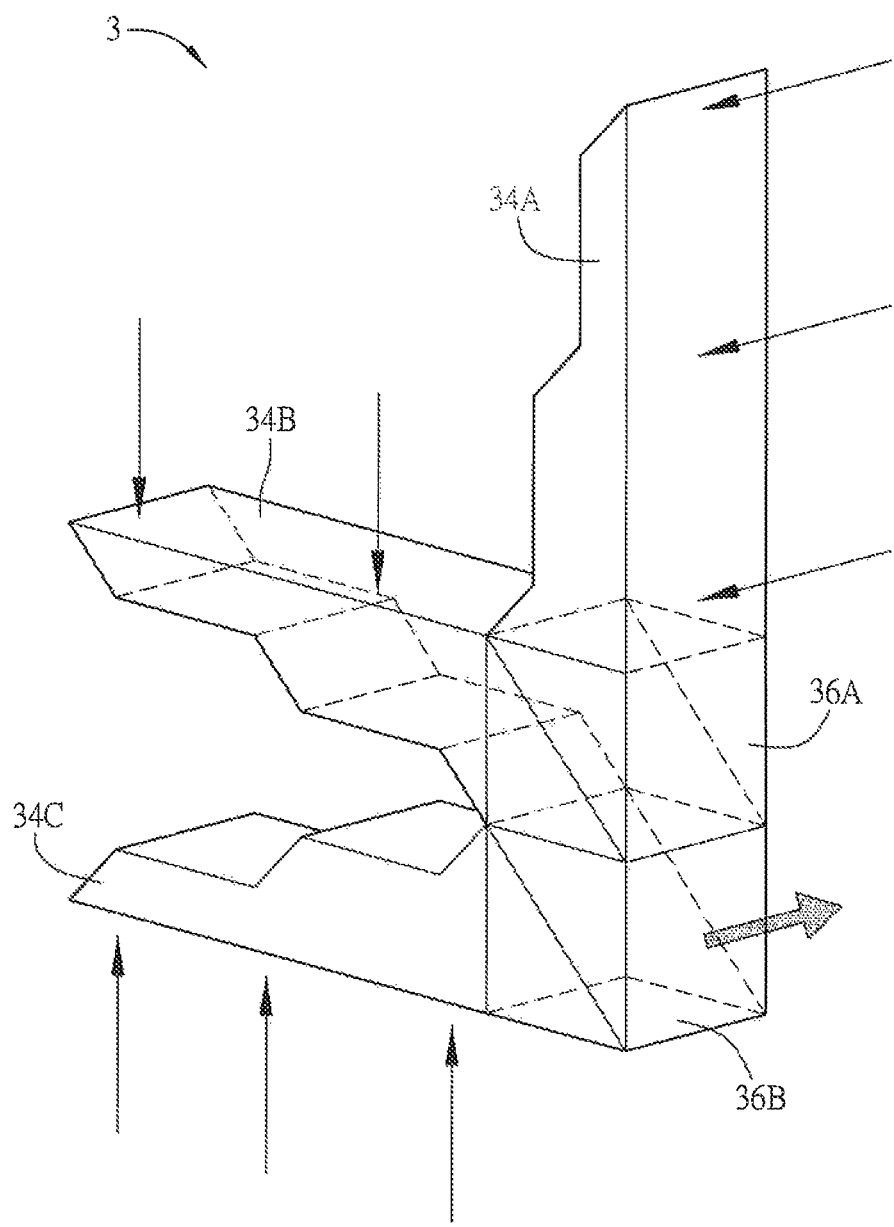
FIG. 3 is a schematic diagram of a light source system according to a third embodiment of the invention.

FIG. 3 is a schematic diagram of a light source system according to a third embodiment of the invention.

Different from the above embodiments, a light combining module is included in this embodiment. As shown in FIG. 3, the light source system 3 includes three light coupling modules 34A, 34B, 34C and two light combining modules 36A, 36B.

From FIG. 3, it is clear that the light combining modules 36A, 36B are disposed on the light output surfaces of the light coupling modules 34A, 34B, 34C.

Likewise, for the easy understanding, the laser sources are not shown in FIG. 3, and just the light beams provided by the laser sources are shown (denoted by the arrows in the figure). Moreover, the light sources at least include red laser, blue laser and green laser. In disposition, three red lasers can cooperate with the light coupling module 34A, three blue lasers can cooperate with the light coupling module 34B, three green lasers can cooperate with the light coupling module 34C (due to the viewing angle, some light beams are not shown in the figure). In other words, through this kind of disposition, the light source system 3 of this embodiment can provide a white light source for the projection device.

As an embodiment, the light coupling module 34A can couple the light beams of the three red lasers, and the light beams of the red lasers will leave through the light output surface of the light coupling module 34A and enter the light combining module 36A. Besides, the light output surface of the light coupling module 34A overlaps (coincides) with the light incident surface of the light combining module 36A. The light beam coupled by the light coupling module 34A is transmitted and enters the light combining module 36A.

The light coupling module 34B can couple the light beams of the three green lasers, and the light beams of the green lasers will leave through the light output surface of the light coupling module 34B and enter the light combining module 36A. Besides, the light output surface of the light coupling module 34B overlaps (coincides) with another light incident surface of the light combining module 36A. After transmitted and entering the light combining module 36A, the light beam coupled by the light coupling module 34B is combined with the light beam out of the light coupling module 34A to become a yellow light beam, and the yellow light beam leaves through the light output surface of the light combining module 36A.

The light coupling module 34C can couple the light beams of the three blue lasers, and the light beams of the blue lasers will leave through the light output surface of the light coupling module 34C and enter the light combining module 36B. Besides, the light output surface of the light coupling module 34C overlaps (coincides) with a light incident surface of the light combining module 36B. Moreover, the light output surface of the light combining module 36A coincides with another light incident surface of the light combining module 36B.

Therefore, the light coupling module 36A can transmit the yellow light that is obtained by coupling the light beam of the light coupling module 34A and the light beam of the light coupling module 34B to the light combining module 36B, and the yellow light will be reflected and mixed with the blue light provided by the light coupling module 34C to become the white light, and the white light leaves through the light output surface of the light combining module 36B.

Although the light combining modules 36A, 363 are spectroscopes exemplarily, they can be reflectors in other embodiments, and in this situation, a light uniform element can be added in according to the requirement. If the light combining modules 36A, 36B are reflectors, the light paths of the light sources need to be considered to achieve the purpose of reflection and combination. For example, a plurality of through holes can be formed on the reflectors so as to advantage the light transmission of the light coupling modules 34A, 34B, 34C, and a light combining element can be added in to generate the white light.

Summarily, in the light source system and the display apparatus of the invention, at least one light coupling module is used to cooperate with the laser module, the light incident surface of the light coupling module is disposed corresponding to the laser module so that the light beams of the laser module can be guided to a plurality of total reflection surfaces so as to be coupled and parallel leave through the light output surface. Thereby, the plurality of light sources can be coupled while the etendue is not increased. So, through the above-mentioned disposition, the invention can provide a light source system that has lower etendue and less light loss and can couple a plurality of light sources.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:
1. A light source system, comprising:
 a laser module including a plurality of laser sources, each of which provides a light beam;
 at least one first light coupling module including:
  a light incident surface including a plurality of light incident zones, wherein the light incident zones are disposed corresponding to the laser sources, respectively;
  a plurality of total reflection surfaces disposed corresponding to the light incident zones, respectively; and a light output surface, wherein the projected areas of the total reflection surfaces on the light output surface have no overlap with each other, wherein the first light coupling module is composed of a plurality of separate prisms attached with each other, and the light travelling of each of the light beams is limited within each of the prisms respectively; and a second light coupling module including:
  a light incident surface including a plurality of light incident zones;
  a plurality of total reflection surfaces disposed corresponding to the light incident zones, respectively; and
  a light output surface, wherein the total reflection surfaces of the second light coupling module face the light output surface of the second light coupling module and the projected areas of the total reflection surfaces of the second light coupling module on the light output surface of the second light coupling module have no overlap with each other, and each of the light beams is reflected only one time by the corresponding total reflection surface of the second light coupling module to leave through the light output surface of the second light coupling module, wherein the light output surface of the first light coupling module and the light incident surface of the second light coupling module coincide with each other.

2. The light source system as recited in claim 1, wherein the light beams of the laser sources enter the first light coupling module, and are reflected by the total reflection surfaces to leave through the light output surface, and the light paths of the light beams are parallel.

3. The light source system as recited in claim 1, wherein the laser sources at least include a red laser, a blue laser and a green laser.

4. A display apparatus, comprising:
a display screen;
a projection device; and
a light source system, providing a light source for the projection device and comprising:
  a laser module including a plurality of laser sources, each of which provides a light beam;
  at least one first light coupling module including:
    a light incident surface including a plurality of light incident zones, wherein the light incident zones are disposed corresponding to the laser sources, respectively;
    a plurality of total reflection surfaces disposed corresponding to the light incident zones, respectively; and
    a light output surface, wherein the projected areas of the total reflection surfaces on the light output surface have no overlap with each other, wherein the first light coupling module is composed of a plurality of separate prisms attached with each other, and the light travelling of each of the light beams is limited within each of the prisms respectively; and a second light coupling module including:
  a light incident surface including a plurality of light incident zones;
  a plurality of total reflection surfaces disposed corresponding to the light incident zones, respectively; and
  a light output surface, wherein the total reflection surfaces of the second light coupling module face the light output surface of the second light coupling module and the projected areas of the total reflection surfaces of the second light coupling module on the light output surface of the second light coupling module have no overlap with each other, and each of the light beams is reflected only one time by the corresponding total reflection surface of the second light coupling module to leave through the light output surface of the second light coupling module, wherein the light output surface of the first light coupling module and the light incident surface of the second light coupling module coincide with each other, wherein the projection device forms a plurality of viewing zones on the display screen.

5. The display apparatus as recited in claim 4, wherein the display screen includes a double-layer lenticular lens, which includes two lenticular lens layers and an omnidirectional diffuser disposed between the two lenticular lens layers.

6. The display apparatus as recited in claim 4, wherein the light beams of the laser sources enter the first light coupling module, and are reflected by the total reflection surfaces to leave through the light output surface, and the light paths of the light beams are parallel.

7. The display apparatus as recited in claim 4, wherein the laser sources at least include a red laser, a blue laser and a green laser.

* * * * *